(12) United States Patent
Keränen et al.

(10) Patent No.: US 11,153,210 B2
(45) Date of Patent: Oct. 19, 2021

(54) CONNECTION SETTINGS FOR WIRELESS DEVICES

(71) Applicant: Telefonaktiebolaget LM Ericsson (publ), Stockholm (SE)

(72) Inventors: Ari Keränen, Helsinki (FI); Veikko Oittinen, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/765,749

(22) PCT Filed: Nov. 20, 2017

(86) PCT No.: PCT/EP2017/079772
§ 371 (c)(1),
(2) Date: May 20, 2020

(87) PCT Pub. No.: WO2019/096422
PCT Pub. Date: May 23, 2019

(65) Prior Publication Data
US 2020/0296040 A1 Sep. 17, 2020

(51) Int. Cl.
*H04L 12/743* (2013.01)
*H04L 9/06* (2006.01)
(Continued)

(52) U.S. Cl.
CPC ........ *H04L 45/7453* (2013.01); *H04L 9/0643* (2013.01); *H04L 61/6054* (2013.01); *H04W 4/12* (2013.01); *H04W 8/20* (2013.01)

(58) Field of Classification Search
CPC .............. H04L 45/7453; H04L 9/0643; H04L 61/6054; H04W 4/12; H04W 8/20
See application file for complete search history.

(56) References Cited

U.S. PATENT DOCUMENTS 8,259,585 B1 * 9/2012 S P .................. H04L 45/125
370/237
10,587,491 B1 * 3/2020 Volpe .................. H04L 43/10
(Continued)

FOREIGN PATENT DOCUMENTS

EP 2166799 A1 3/2010
WO 2017044016 A1 3/2017

OTHER PUBLICATIONS

International Search Report and the Written Opinion of the International Searching Authority, issued in corresponding International Application No. PCT/EP2017/079772, dated Jan. 31, 2018, 11 pages.
(Continued)

*Primary Examiner* — Chandrahas B Patel
(74) *Attorney, Agent, or Firm* — Rothwell, Figg, Ernst & Manbeck, P.C.

(57) ABSTRACT

Embodiments disclosed herein relate to methods and apparatus for connecting to a communications network using one of a plurality of connection settings. The method comprises obtaining an operator identification and applying one or more first hash functions, associated with a first Bloom filter, to the operator identification to provide one or more first hash values respectively. The method further comprises responsive to the one or more first hash values matching the first Bloom filter, attempting a connection with the communications network using a first one of the plurality of connection settings which is associated with the first Bloom filter.

31 Claims, 13 Drawing Sheets

(51) Int. Cl.
*H04L 29/12* (2006.01)
*H04W 4/12* (2009.01)
*H04W 8/20* (2009.01)

(56) References Cited

U.S. PATENT DOCUMENTS

| | | | |
|---|---|---|---|
| 10,609,543 B2* | 3/2020 | Yong | H04W 76/14 |
| 10,719,674 B2* | 7/2020 | Fischer | G06K 19/0723 |
| 11,005,950 B1* | 5/2021 | Lambert | H04L 67/1065 |
| 2013/0223308 A1 | 8/2013 | Chandra et al. | |

OTHER PUBLICATIONS

Yong et al. "Generic Service Discovery Proposal: Dynamic Bloom Filter Operation" Jun. 17, 2014 IEEE-SA mentor, Piscataway, NJ USA, vol. 802.11aq, No. 2, Jul. 14, 2014, pp. 1-15.

* cited by examiner

CONNECTION SETTINGS FOR WIRELESS DEVICES

CROSS REFERENCE TO RELATED APPLICATION(S)

This application is a 35 U.S.C. § 371 National Phase Entry Application from PCT/EP2017/079772, filed Nov. 20, 2017, designating the United States, the disclosure of which is incorporated herein by reference in its entirety.

TECHNICAL FIELD

Embodiments disclosed herein relate to methods and apparatus for connecting to a communications network using one of a plurality of connection settings, for example Access Point Name (APN) settings.

BACKGROUND

In order for wireless devices to secure a working packet switched data connection to a communications network, for example, a Packet Data Network (PDN), each wireless device may be required to provide connection settings, for example Access Point Name (APN) settings. The connection settings may only result in a successful connection with the communications network if they are compatible with a particular subscription to an Operator that the wireless device is using to access the PDN.

Some devices may comprise a comprehensive APN settings database that uses megabytes of memory. However, recent developments in Internet of Things (IoT) devices has resulted in the production of simple wireless devices which have limited memory, computing resources, energy and interfaces. It may therefore not be feasible to consider providing a comprehensive APN settings database in each IoT device, as a large amount of memory space may be required. It is also difficult to consider manually inserting APN settings into constrained IoT devices due to a lack of input interfaces. It may also be difficult to provide auto-configuration options for such constrained IoT devices.

SUMMARY

According to embodiments disclosed herein there is therefore provided a method in a wireless device for connecting to a communications network using one of a plurality of connection settings. The method comprises obtaining an operator identification and applying one or more first hash functions, associated with a first Bloom filter, to the operator identification to provide one or more first hash values respectively. The method further comprises comparing the one or more first hash values to the first Bloom filter; and responsive to the one or more first hash values matching the first Bloom filter, attempting a connection with the communications network using a first one of the plurality of connection settings which is associated with the first Bloom filter.

According to some embodiments there is provided a computer program comprising instructions which, when executed on at least one processor, cause the at least one processor to carry out the method as described above.

According to some embodiments there is provided a computer program product comprising a computer-readable medium with the computer program as described above.

According to some embodiments there is provided a wireless device for connecting to a communications network using one of a plurality of connection settings. The wireless device comprises an interface; and a processor. The processor is operable to obtain an operator identification and apply one or more first hash functions, associated with a first Bloom filter, to the operator identification to provide one or more first hash values respectively. The processor is further operable to compare the one or more first hash values to the first Bloom filter; and responsive to the one or more first hash values matching the first Bloom filter, attempt a connection with the communications network using a first one of the plurality of connection settings which is associated with the first Bloom filter.

BRIEF DESCRIPTION OF THE DRAWINGS

For a better understanding of the embodiments disclosed herein, and to show how it may be put into effect, reference will now be made, by way of example only, to the accompanying drawings, in which.

DESCRIPTION

Figure 1:
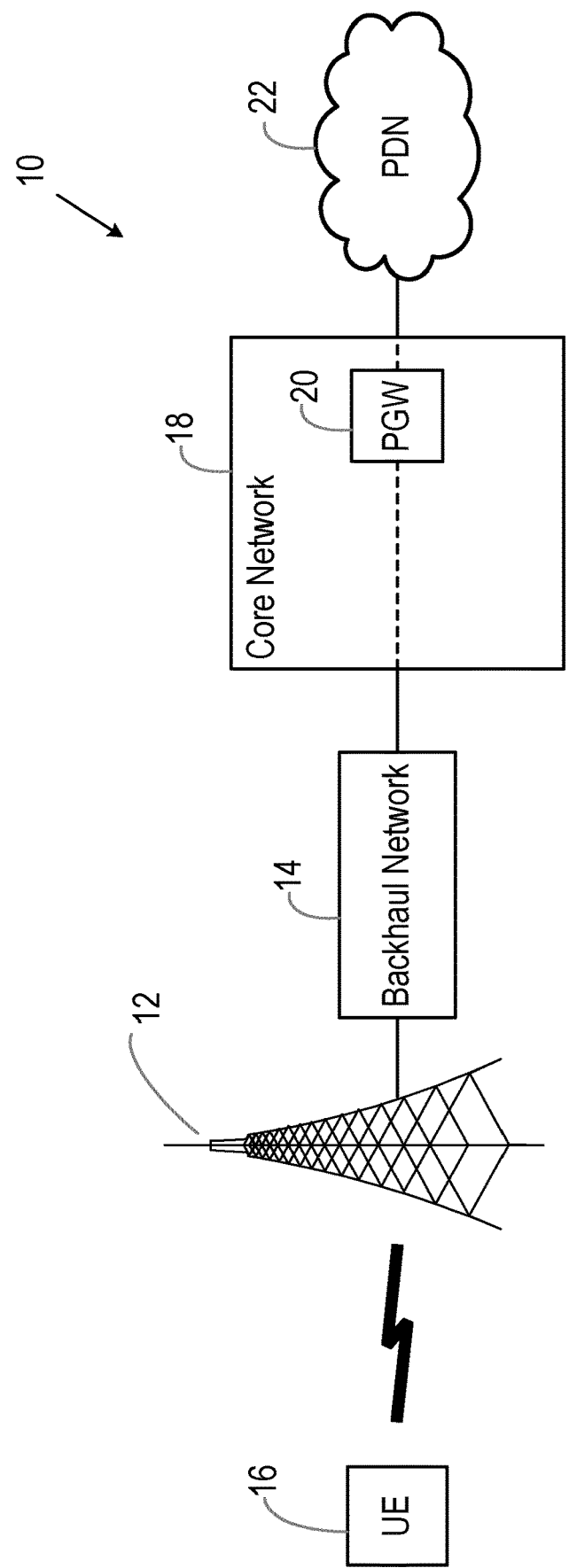
FIG. 1 illustrates a wireless communications network 10.

The following sets forth specific details, such as particular embodiments for purposes of explanation and not limitation. But it will be appreciated by one skilled in the art that other embodiments may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers that are specially adapted to carry out the processing disclosed herein, based on the execution of such programs. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Although the description is given for a wireless device, or user equipment (UE), it should be understood by the skilled in the art that "UE" is a non-limiting term comprising any mobile or wireless terminal, device or node equipped with a radio interface allowing for at least one of: transmitting signals in uplink (UL) and receiving and/or measuring signals in downlink (DL). A wireless device may therefore be capable of wirelessly connecting to a wireless communications network, for example a cellular network. A UE herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode.

The description involves communication between a wireless device and a radio access network, which typically includes multiple radio access nodes. In the specific example given, the radio access nodes take the form of eNodeBs (eNBs), as defined by 3GPP, or gNodeBs (gNBs) as utilised in the future standards expected to meet the 5G requirements. However, it will be appreciated that the concepts described herein may involve any radio access nodes. Moreover, where the following description refers to steps taken in or by a radio access node, this also includes the possibility that some or all of the processing and/or decision making steps may be performed in a device that is physically separate from the radio antenna of the radio access node, but is logically connected thereto. Thus, where processing and/or decision making is carried out "in the cloud", the relevant processing device is considered to be part of the radio access node for these purposes.

Embodiments disclosed herein relate to the use of Bloom filters for storing connection settings such as APN settings in a wireless device. Bloom filters are probabilistic data structures that can be used to test whether or not an element is a member of a set. Bloom filters may be extremely memory efficient, but may produce false positives.

FIG. 1 illustrates a wireless communications network 10 that may be utilized to explain the principles of embodiments of the present disclosure. The network 10 comprises a base station 12 which is connected, via a backhaul network 14, to a core network 18. The core network 18 is then connected via Packet Data Network Gateway (PGW) 20 to a communications network, for example Packet Data Network (PDN) 22. PDN 22 may be for example, a public internet network.

The base station 12 may be referred to as for example, a radio access node, a NodeB, evolved NodeB (eNB or eNodeB), gNodeB, a base transceiver station, an access point Base Station, a base station router, a Radio Base Station (RBS), a macro base station, a micro base station, a pico base station, a femto base station, a Home eNodeB, a relay and/or a repeater, a beacon device or any other network node configured for communication with wireless devices over a wireless interface depending, for example, on the radio access technology and terminology used.

A wireless device 16 (also referred to as a wireless terminal, or UE) is in wireless communication with the base station 12. In some embodiments, the wireless device 16 is an IoT device with limited memory and processing power. The wireless device 16 may also have no interface with which to manually input any APN connection settings into the wireless device 16.

For example, the wireless device 16 may be located within a cell or beam which the base station 12 serves. Messages transmitted by the wireless device 16 to the base station 12 are said to be transmitted in the "uplink", while messages transmitted by the base station 12 to the wireless device 16 are said to be transmitted in the "downlink". The wireless device may therefore connect with the PDN via the base station 12 and core network 18 using some connection settings, for example APN connection settings, or Multimedia Messaging Service (MMS) settings.

APN connection settings are the settings a wireless device may use to set up a connection via PGW 20 between an Operator's cellular network and another computer network, for example the PDN 22 as shown in in FIG. 1. An Operator may be otherwise referred to as a wireless service provide, wireless carrier, cellular company, Mobile Network Operator (MNO), or mobile network carrier.

A wireless device 16 making a data connection with PDN 22 may be configured with connection settings, for example APN settings, to present to the Operator. When the wireless device transmits an access request to access the PDN, the Operator may then check these APN settings to determine what type of network connection should be created. For example, if the APN settings are incorrect or unknown to the Operator, for example a Mobile Management Entity (MME) in the core network 18 may reject the wireless device's access request to connect with the PDN.

In some examples, the APN settings may indicate which Internet Protocol (IP) addresses should be assigned to the wireless device 16, which security methods should be used, and how or if, the wireless device 16 may be connected to some private customer network.

In some embodiments, the APN settings identify the Packet Data Network (PDN) that a wireless device 16 is requesting communication with. In addition to identifying a PDN, the APN settings may also be used to define the type of service request, for example, the type of service may be a connection to a Wireless Application Protocol (WAP) server, or a Multimedia Messaging Service (MMS) that can be provided by the PDN.

In embodiments disclosed herein, the wireless device stores a plurality of connection settings, for example APN settings, in a database that uses Bloom filters to compress the data required to store the connection settings. Since many Operators share the same, or very similar connection settings, Operator Identifications (Operator IDs) for all the Operators which are compatible with a particular connection setting can be stored in a Bloom filter associated with that particular connection setting. An Operator is compatible with a particular connection setting if a wireless device, subscribed to the Operator, may obtain a successful connection to a PDN using said particular connection setting.

When a wireless device needs to find suitable connection settings, it may obtain the Operator ID, for example by deriving the Operator ID from an International Mobile Subscriber Identity (IMSI) retrieved from a Subscriber Identity Module (SIM) in the wireless device. The wireless device may then search for the Operator ID in a plurality of preconfigured Bloom filters to determine whether any of the associated connection settings are compatible with the Operator identified by the retrieved Operator ID. The Operator ID may comprise any identification that may be used to determine which connection settings may be used. In some examples, a single Operator may be associated with a plurality of different Operator IDs.

Figure 2:
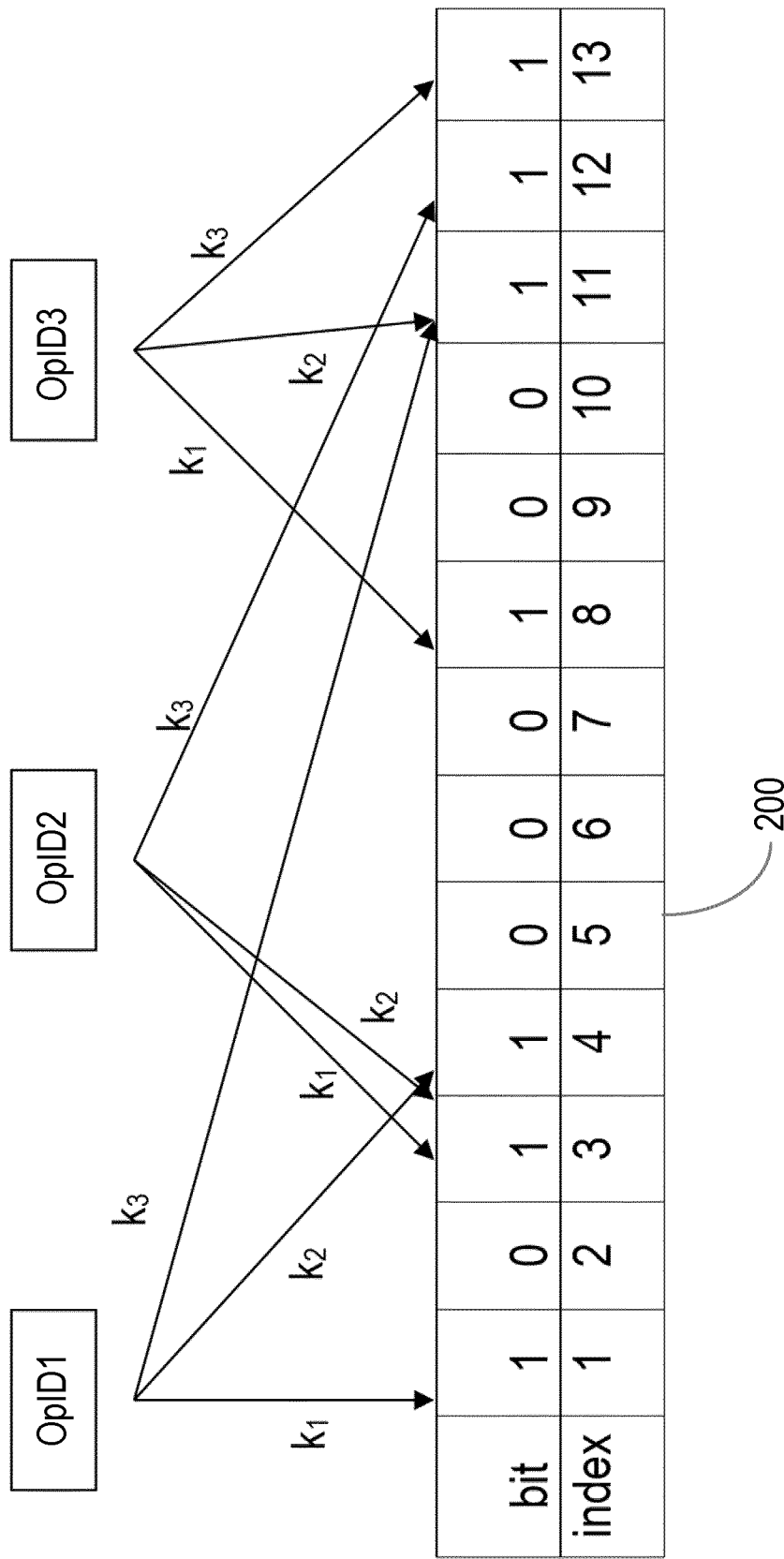
FIG. 2 illustrates an example of a Bloom filter 200 according to some embodiments.

FIG. 2 illustrates an example of a Bloom filter 200 according to some embodiments.

The Bloom filter 200 comprises an integer number, m, of bits, where in this example m is 13. In order to populate the Bloom filter, k hash functions, in this example hash functions $k_1$, $k_2$, and $k_3$, are performed on the elements which are to be stored in the Bloom filter. In this example, the Bloom filter 200 is representative of 3 elements, namely the Operator IDs: OpID1, OpID2 and OpID3.

It will be appreciated that Bloom filters according to embodiments disclosed herein may be of any size and may represent any number of elements. Wireless devices according to embodiments disclosed herein may store a plurality of Bloom filters of the same or different sizes.

In this example each of the hash functions $k_1$, $k_2$ and $k_3$ set one of them bits in the Bloom filter to the value 1. It will however, be appreciated that in some embodiments more complex hash functions may be used. For examples, some hash functions may set more than one bit in the m bits of the Bloom filter to 1.

In the example of FIG. 2, the hash function $k_1$ when performed on OpID1 sets the bit with bit index 1 in the Bloom filter 200 to value 1. The hash function $k_1$ when performed on OpID2 sets the bit with bit index 3 in the Bloom filter 200 to value 1. The hash function $k_1$ when performed on OpID3 sets the bit with bit index 8 in the Bloom filter 200 to value 1.

The hash function $k_2$ when performed on OpID1 sets the bit with bit index 4 in the Bloom filter 200 to value 1. The hash function $k_2$ when performed on OpID2 sets the bit with bit index 4 in the Bloom filter 200 to value 1, similarly to the hash function $k_2$ when performed on OpID1. The hash function $k_2$ when performed on OpID3 sets the bit with bit index 11 in the Bloom filter 200 to value 1.

The hash function $k_3$ when performed on OpID1 sets the bit with bit index 11 in the Bloom filter 200 to value 1, similarly to the hash function $k_2$ when performed on OpID3.

The hash function $k_3$ when performed on OpID2 sets the bit with bit index 12 in the Bloom filter 200 to value 1. The hash function $k_3$ when performed on OpID3 sets the bit with bit index 13 in the Bloom filter 200 to value 1.

In this example therefore, the Bloom filter 200 represents the Operator IDs OpID1, OpID2 and OpID3 with 13 bits, where bits with index 1, 3, 4, 8, 11, 12 and 13 are set to value 1.

It will be appreciated, that Bloom filters may be represented differently, for example, setting values to 0 rather than 1, or using some other suitable representation.

A wireless device may therefore be configured with a Bloom filter such as Bloom filter 200, where it is known that the Operators IDs OpID1, OpID2 and OpID3 all identify Operators which are compatible with a particular connection setting, for example APN setting, APN1. The Bloom filter 200 may therefore be stored in the wireless device in such a way that it is associated with the appropriate connection setting, in this example an APN setting APN1.

The APN setting APN1 may comprise an Access Point Name, a username and a password. For example:
APN: Internet
username: empty
password: empty Alternatively, the connection setting, APN1, may comprise only the APN itself. A second connection setting, APN-u1, may comprise the username, and a third connection setting, APN-p1, may comprise the password. To obtain the connection settings the wireless device may therefore search for the APN, username, and password separately in different Bloom filters. It will be appreciated that other connection settings, for example MMS settings may also be separated in a similar manner.

In other words, each APN setting may comprise one or more of an APN, a username and a password.

It will be appreciated that other forms of connection setting such as an MMS setting may be associated with a Bloom filter for use in connecting to an MMS service.

A wireless device may therefore be configured to store a plurality of Bloom filters, such as the one illustrated in FIG. 2. Each Bloom filter may represent any number of Operator IDs, and may be associated with a particular connection setting. The particular connection setting may be used by a wireless device which is subscribed to any of the Operators identified by the Operator IDs which are represented by the associated Bloom filter. The stored Bloom filters may be precomputed, for example during wireless device software development or software installation, and installed on to the wireless device as a database.

Figure 3:
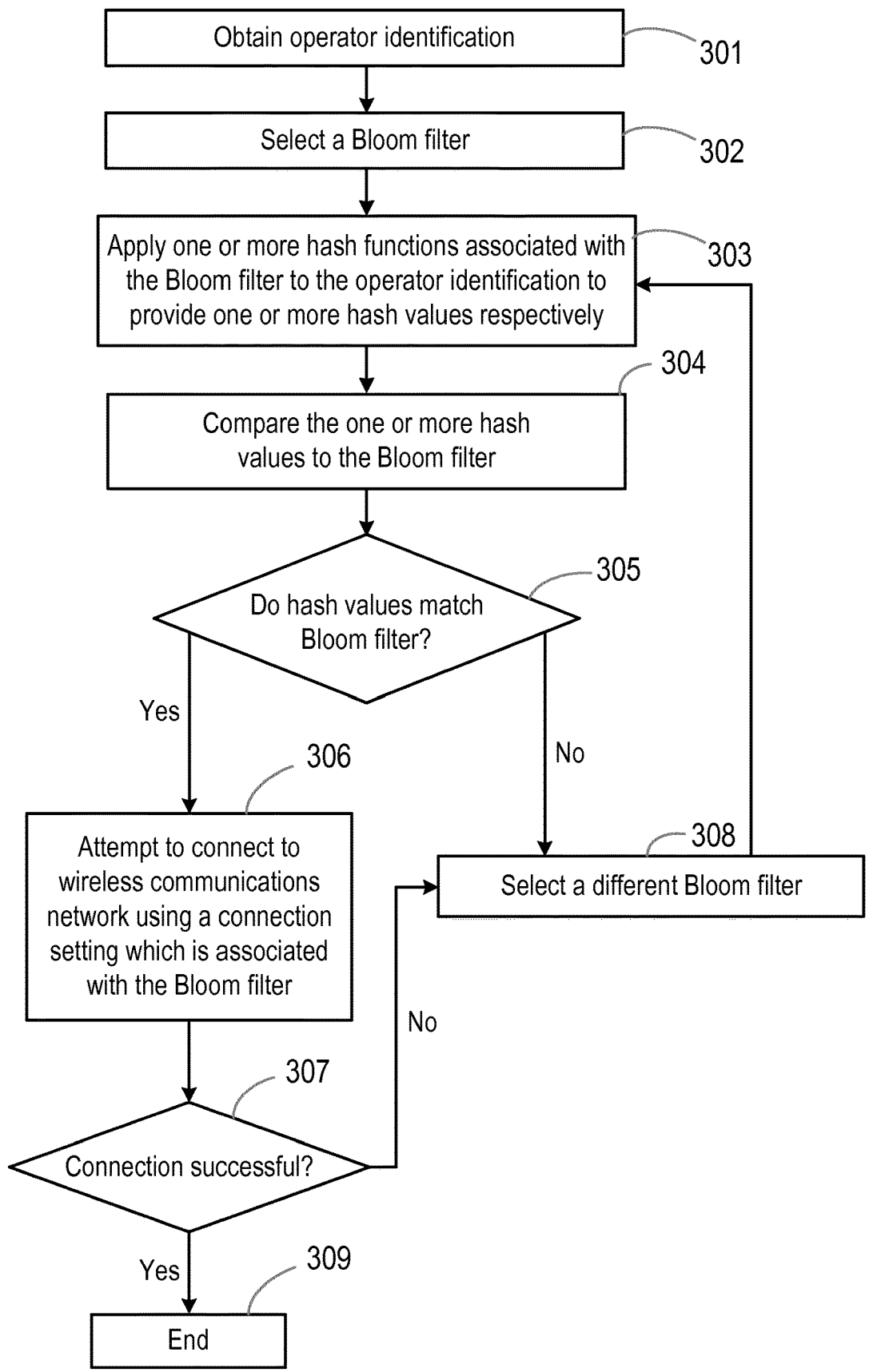
FIG. 3 illustrates a method in a wireless device for connecting to a Packet Data Network (PDN)

FIG. 3 illustrates a method in a wireless device for connecting to a communications network, for example a Packet Data Network (PDN), using one of a plurality of connection settings. The method may be performed for example by a wireless device 16 attempting to connect to a PDN 22 as illustrated in FIG. 1.

In step 301, the wireless device obtains an Operator ID. For example, the wireless device may retrieve an IMSI from a SIM in the wireless device. The wireless device may then derive a default Operator ID from the IMSI. The Operator ID may in some examples comprise the first five bits of the IMSI.

Step 301 may occur in response to any circumstance which the wireless device requests or requires any Subscriber Identity Module (SIM) information. For example, step 301 may occur in response to the wireless device booting. In some embodiments, step 301 may occur in response to a connection between the wireless device and the communications network being lost. In some embodiments, step 301 may occur in response to the device requiring data to be sent to the communications network. In some examples, the wireless device may have been collecting data for a period of time, and may then request that this data be transmitted to the communications network.

In step 302, the wireless device selects a first Bloom filter from a plurality of stored Bloom filters. For example, the wireless device may select the Bloom filter 200 illustrated in FIG. 2. As previously mentioned the wireless device may comprise a database storing a plurality of Bloom filters, each generated from at least one Operator ID, wherein each Bloom filter is associated with one of the plurality of connection settings. In some embodiments, the database may be stored externally to the wireless device.

In step 303 the wireless device applies one or more first hash functions associated with the first Bloom filter to the Operator ID obtain in step 301 to provide one or more first hash values. For example, in the example where the first Bloom filter is the Bloom filter 200 illustrated in FIG. 2, the wireless device may apply the first hash functions $k_1$, $k_2$, and $k_3$ to the obtained Operator ID. In this example, the one or more first hash values each comprise m bits, where one bit out of the m bits is set to a value 1.

In step 304, the one or more first hash values are compared to the first Bloom filter. If the database of Bloom filters is stored externally to the wireless device, the wireless device may transmit the one or more first hash values to the external database to compare the one or more first hash values to the first Bloom filter.

In step 305, the method comprises determining whether the one or more first hash values match the first Bloom filter. In other words, if the bits which were set to a value 1 in each of the one or more first hash values are also set to 1 in the first Bloom filter, then the wireless device may determine that the one or more first hash values match the first Bloom filter.

If the one or more first hash values match the first Bloom filter, the method passes to step 306, in which the wireless device attempts to connect to the PDN using a first one of the plurality of connection settings which is associated with the first Bloom filter, i.e. in this example APN1. If the database is stored externally to the wireless device, the external database may transmit the connection setting, for example APN1, to the wireless device.

Figure 4:
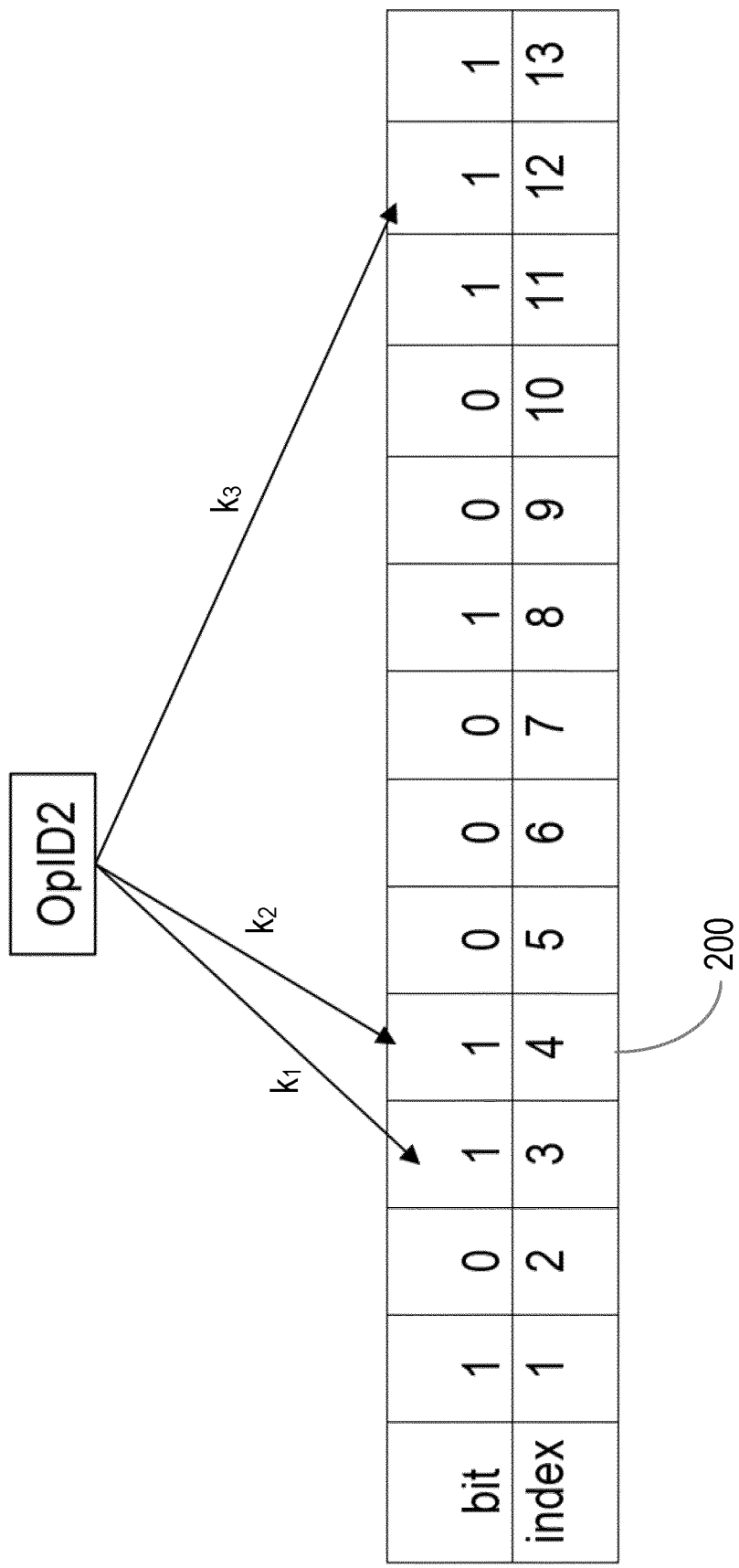
FIG. 4 illustrates an example of an Operator ID which produces a true positive match in the Bloom filter show in FIG. 2.

In step 307, the wireless device determines if the connection attempt was successful. If the connection attempt was successful, the method ends in step 309. If the connection attempt is successful, this is indicative of the Operator ID obtained in step 301 being one of the Operator IDs which was used to generate the first Bloom filter. For example, the wireless device may have obtained OpID2 in step 301 which, as illustrated in FIG. 4, was one of the Operator IDs used to generate the Bloom filter 200. FIG. 4 therefore illustrates a true positive match in the Bloom filter 200 shown in FIG. 2.

If the connection attempt was not successful, the method passes to step 308 in which the wireless device selects a different Bloom Filter, for example a second Bloom filter.

If at step 307 the connection attempt is not successful, this may be indicative of a false positive occurring when the one or more first hash values are determined to match the Bloom filter in in step 305. For example, the wireless device may have obtained OpID4 in step 301.

Figure 5:
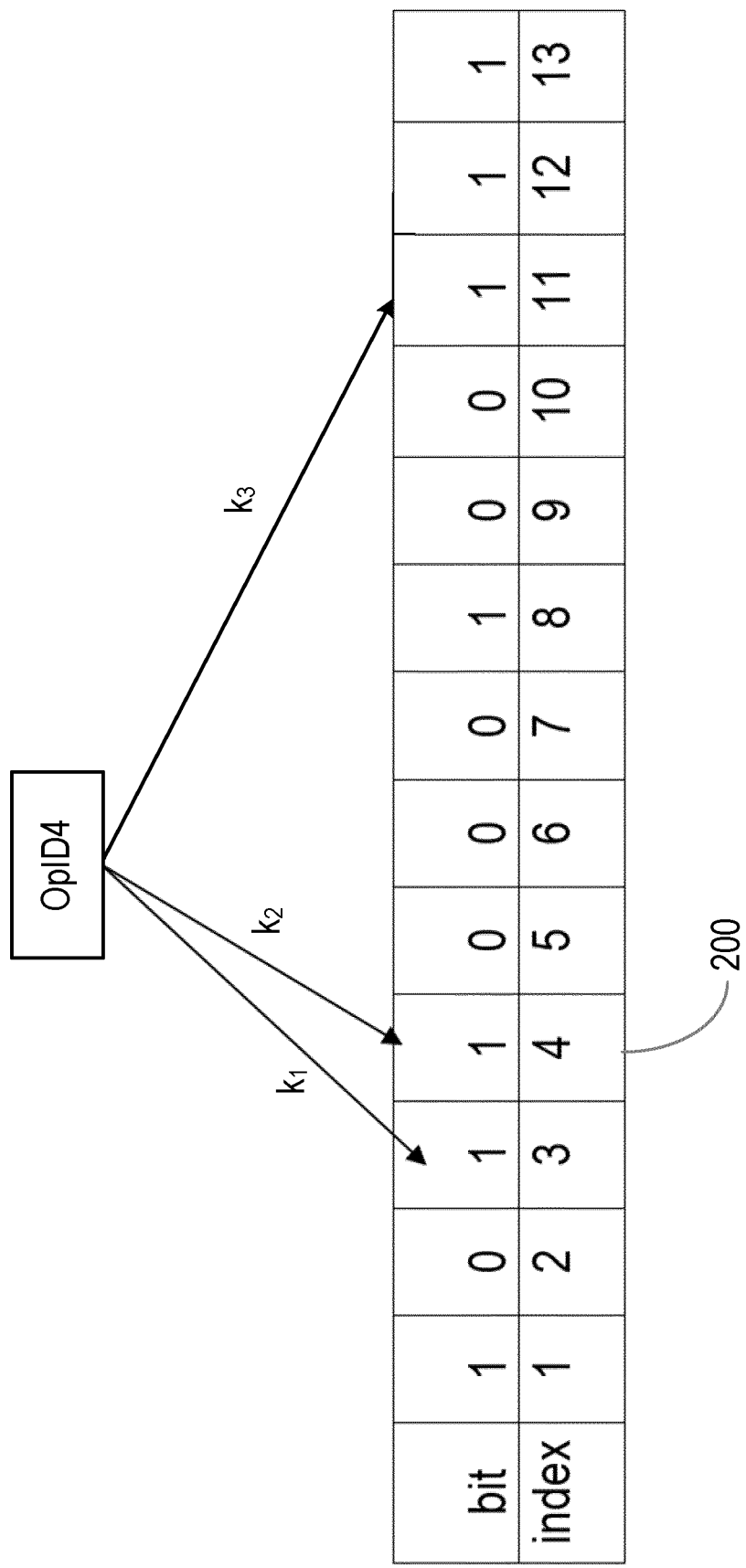
FIG. 5 illustrates an example of an Operative ID which produces a false positive match in the Bloom filter shown in FIG. 2.

FIG. 5 illustrates a false positive match in the Bloom filter 200. OpID4 produces hash values which match the Bloom filter, but OpID4 is not the same as any of the Operator IDs which were used to generate the Bloom filter 200. In other words, although the bits set to value 1 in the hash values produced by applying the hash functions $k_1$, $k_2$, and $k_3$ to OpID4, are all set to a value 1 in the Bloom filter 200, OpID4 is not the same as any of OpID1, OpID2, or OpID3.

Therefore, when the wireless device attempts to connect to the PDN using APN1 in step 306, the network, may determine that APN1 is not a connection setting that may be used with the Operator, OpID4, and therefore the connection attempt is unsuccessful.

Alternatively, if at step 307 the connection attempt is not successful, this may be indicative of the Bloom filter incorrectly linking the obtained Operator ID to the connection settings, or the connection settings may be invalid connection settings.

Figure 6:
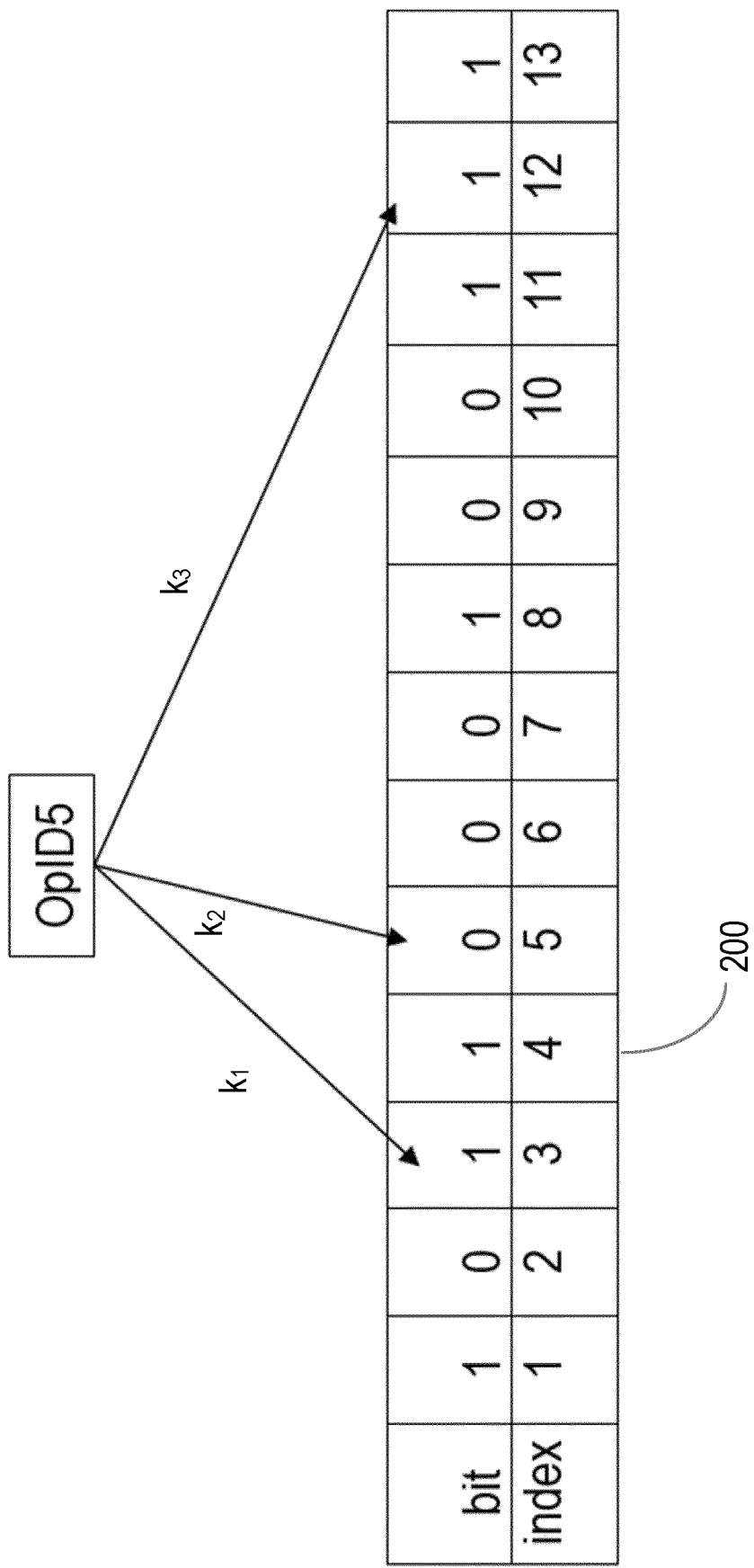
FIG. 6 illustrates an example of an Operator ID which does not match the Bloom filter shown in FIG. 2.

Returning to step 305, if the one or more first hash values do not match the first Bloom filter, the method also passes to step 308 in which a different Bloom filter is selected, for example a second Bloom filter. FIG. 6 illustrates an example of an Operator ID, for example OpID6, which does not match the Bloom filter 200. This is because the hash function $k_2$ produces a hash value in which the bit set to value 1 is set to value 0 in the Bloom filter 200.

Once a second Bloom filter is selected in step 308, either as a result of an unsuccessful connection in step 307, or the one or more first hash values not matching the first Bloom filter in step 305, the method passes back to step 303 in which the wireless device applies one or more second hash functions, associated with the second Bloom filter, to the obtained Operator ID to provide one or more second hash values respectively. It will be appreciated that the one or more second hash functions may be the same as the one or more first hash functions. By using the same hash functions for the different stored Bloom filters, the implementation code size, and therefore memory requirements may be reduced. In some embodiments, however, the second hash functions may be different to the first hash functions.

The second Bloom filter may be representative of different Operator IDs, for example, OpID5 OpID6, OpID7 and OpID8. These Operator IDs may be used with a second connection setting, for example APN2. It will be appreciated that the second Bloom filter may comprise a different number of bits to the first Bloom filter, and may be associated with any number of second hash functions.

The method may then continue until a successful connection is achieved, or until all Bloom filters stored by the wireless device have been searched using the method as described in FIG. 3.

The following pseudocode illustrates how the aforementioned method may be implemented in software.

```
Settings_1:
    APN: internet
    username: empty
    password: empty
Operators for Settings_1: 42, 56, 76, 78, 109, 334, 545, 789
Bloomf_1 <- Hash-for-each (Operators for Settings_1)
Database:
Bloomf_1 -> Settings_1
Retrieving settings
Oper_ID <- get-operator-from-SIM-card( )
foreach Bloomf_i in Database:
    if (Bloomf_i.contains(Oper_ID))
        Settings <- get-settings(Bloomf_i)
        if (test-settings(Settings))
            apply-settings(Settings)
            success
failure /* none of the filters matched /*
```

The following illustrates a specific example of a 512 bit Bloom filter representing 86 Operator IDs associated with 4 hash functions. In this example, the 4 hash functions set 4 bits in the Bloom filter to value 1. For example, the hash functions may comprise using a SHA-256 hash function to hash the Operator ID, followed by taking the result of the SHA-256 hash and dividing it into four parts. The 8-bit values in each of the four parts may then be computed together, for example, by addition. A modulo 512 may then be then taken from each part and the resulting four bits may be the result of the 4 hash functions.

In this example, the Operator ID comprises the first five digits (Mobile Country Code (mcc)+Mobile Network Code (mnc)) of the IMSI which may be retrieved from the SIM of the wireless device.

If, for this example, a database was built using plain text to store these connection settings, the resulting size of the database would be 1118 bytes (5 bytes for the mcc+mnc and 8 bytes for the APN setting of "internet", multiplied by the 86 different Operator entries). Alternatively, if a pointer to a single instance of the setting is used, the plain text databased would consume 438 bytes (86 Operator entries multiplied by the 5 bytes for the mcc+mnc, and 8 bytes for the single entry of the APN setting "internet").

However, by using a Bloom filter as described above, the same information can be stored in only 72 bytes (64 for the Bloom filter and 8 bytes for the APN setting of "internet"). Furthermore, the 512 bit Bloom filter representing 86 Operator IDs using 4 hash functions, provides a false positive rate of under 6%. This means that, in this example, the likelihood of making an unsuccessful connection to the PDN is very low.

Whilst using a SHA-256 hash function may reduce the speed with which the Bloom filter can be searched, it is a hash function which may already be stored in the wireless device memory for use in secure communications. The use of this hash function may therefore remove the need for any additional memory to store new hash functions for associating with the Bloom filters. This may therefore outweigh any requirement to search the stored Bloom filters quickly.

The following code illustrates how the aforementioned example of a 512 bit Bloom filter which represents 86 Operator IDs may be implemented in software. This code is given in working C/C++ code. However, it will be appreciated that other coding languages may be used to implement the same method.

```
/* Bloomfilter search for APN info. Takes in mcc+mnc and hashes
that with
    * sha256, takes 4 bit positions from that and searches from the filter.
*/
bool bf_internet(const char* imsi) {
        unsigned char hash[32];
        unsigned char input[10];
        size_t input_length = 5;
        for(int y = 0; y < (int)input_length; y++) {
                input[y] = (unsigned char) imsi[y];
        }
        crypto_sha256( input, input_length, hash, 0);
        for(int i = 0; i < 4; i++) {
                unsigned int sum = 0;
                for(int j = 0; j < 8; j++){
                        sum += hash[i*4+j];
                }
                sum = sum<<23>>23;
                unsigned char res = 1<<sum%8;
                if (res != (internet_filter[sum/8]&res))
                        return false;
        }
        return true;
}
```

Figure 7:
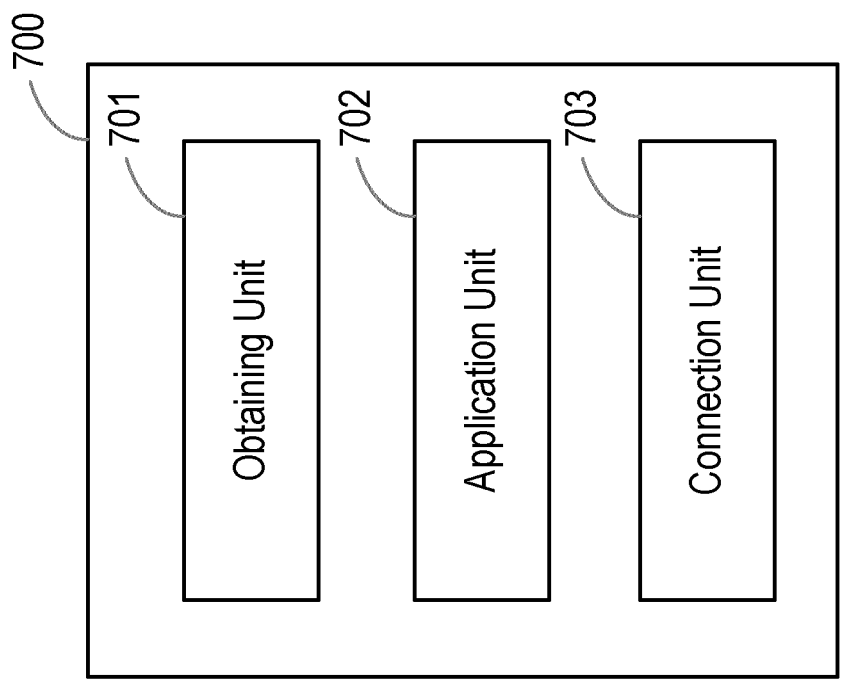
FIG. 7 illustrates a wireless device according to some embodiments.

FIG. 7 illustrates a wireless device according to some embodiments. The wireless device 700 may be configured to connect to a communications network using one of a plurality of connection settings. The wireless device 700 comprises an obtaining unit 701 for obtaining an operator identification. The wireless device 700 also comprises an application unit 702 configured to apply one or more first hash functions, associated with a first Bloom filter, to the operator identification to provide one or more first hash values respectively. The wireless device 700 further comprises a connection unit 703 configured to, responsive to the one or more first hash values matching the first Bloom filter, attempt a connection with the communications network using a first one of the plurality of connection settings which is associated with the first Bloom filter.

Figure 8:
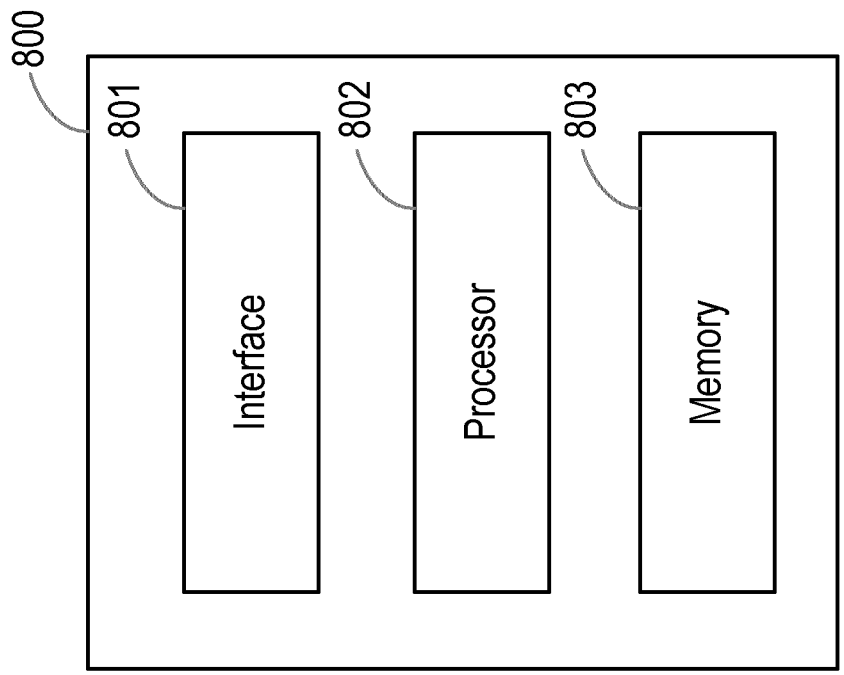
FIG. 8 illustrates a wireless device according to some embodiments.

FIG. 8 illustrates a wireless device according to some embodiments. The wireless device 800 may be configured to connect to a communications network using one of a plurality of connection settings. The wireless device comprises an interface 801 and a processor 802. The processor is operable to obtain an operator identification and apply one or more first hash functions, associated with a first Bloom filter, to the operator identification to provide one or more first hash values respectively. The processor is further operable to compare the one or more first hash values to the first Bloom filter; and responsive to the one or more first hash values matching the first Bloom filter, attempt a connection with the communications network using a first one of the plurality of connection settings which is associated with the first Bloom filter. The wireless device 800 may further comprise memory 803 configured to store the first Bloom filter.

Figure 9:
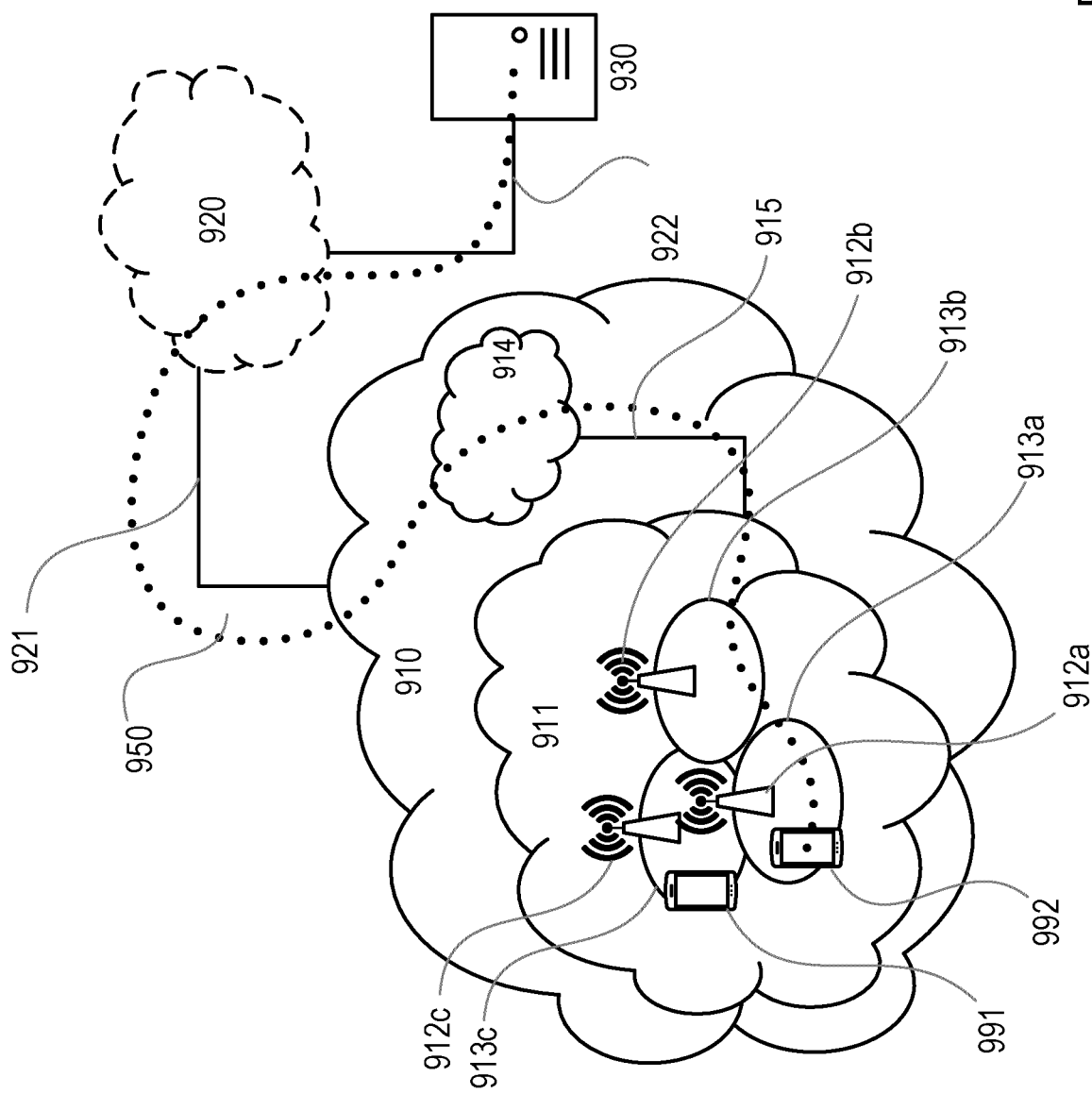
FIG. 9 illustrates a telecommunication network connected via an intermediate network to a host computer in accordance with some embodiments.

FIG. 9 illustrates a telecommunication network connected via an intermediate network to a host computer in accordance with some embodiments.

With reference to FIG. 9, in accordance with an embodiment, a communication system includes telecommunication network 910, such as a 3GPP-type cellular network, which comprises access network 911, such as a radio access network, and core network 914. Access network 911 comprises a plurality of base stations 912a, 912b, 912c, such as NBs, eNBs, gNBs or other types of wireless access points, each defining a corresponding coverage area 913a, 913b, 913c. Each base station 912a, 912b, 912c is connectable to core network 914 over a wired or wireless connection 915. A first UE 991 located in coverage area 913c is configured to wirelessly connect to, or be paged by, the corresponding base station 912c. For example, the first UE 991 may be the wireless device 16 of FIG. 1, and the base station 912c may be the base station 12 of FIG. 1. A second UE 992 in coverage area 913a is wirelessly connectable to the corresponding base station 912a. While a plurality of UEs 991, 992 are illustrated in this example, the disclosed embodiments are equally applicable to a situation where a sole UE is in the coverage area or where a sole UE is connecting to the corresponding base station 912. Telecommunication network 910 is itself connected to host computer 930, which may be embodied in the hardware and/or software of a standalone server, a cloud-implemented server, a distributed server or as processing resources in a server farm. Host computer 930 may be under the ownership or control of a service provider, or may be operated by the service provider or on behalf of the service provider. Connections 921 and 922 between telecommunication network 910 and host computer 930 may extend directly from core network 914 to host computer 930 or may go via an optional intermediate network 920. Intermediate network 920 may be one of, or a combination of more than one of, a public, private or hosted network; intermediate network 920, if any, may be a backbone network or the Internet; in particular, intermediate network 920 may comprise two or more sub-networks (not shown).

The communication system of FIG. 9 as a whole enables connectivity between the connected UEs 991, 992 and host computer 930. The connectivity may be described as an over-the-top (OTT) connection 950. Host computer 930 and the connected UEs 991, 992 are configured to communicate data and/or signaling via OTT connection 950, using access network 911, core network 914, any intermediate network 920 and possible further infrastructure (not shown) as intermediaries. OTT connection 950 may be transparent in the sense that the participating communication devices through which OTT connection 950 passes are unaware of routing of uplink and downlink communications. For example, base station 912 may not or need not be informed about the past routing of an incoming downlink communication with data originating from host computer 930 to be forwarded (e.g., handed over) to a connected UE 991. Similarly, base station 912 need not be aware of the future routing of an outgoing uplink communication originating from the UE 991 towards the host computer 930.

Figure 10:
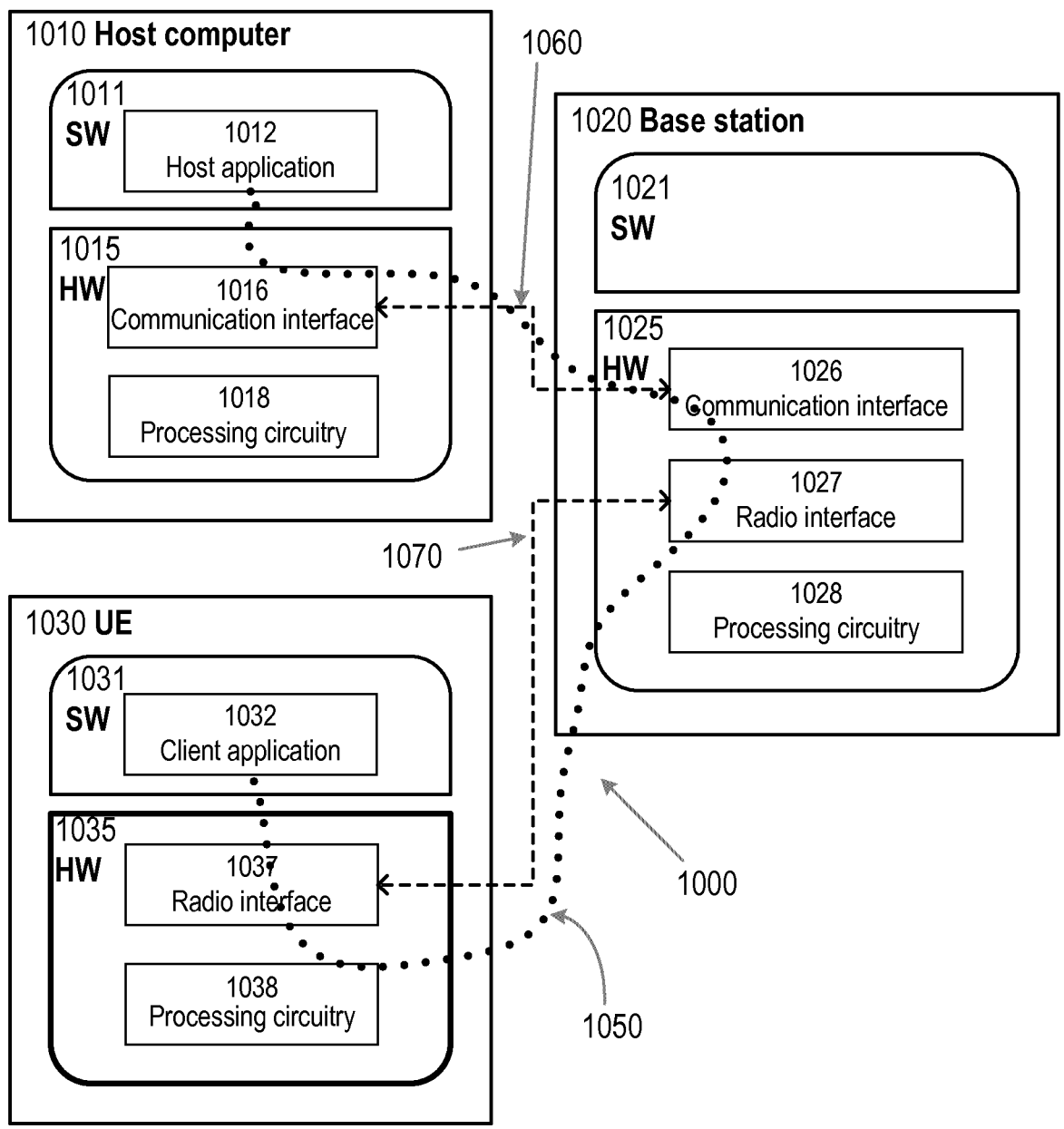
FIG. 10 illustrates a host computer communicating via a base station with a user equipment over a partially wireless connection in accordance with some embodiments.

FIG. 10 illustrates a host computer communicating via a base station with a user equipment over a partially wireless connection in accordance with some embodiments. Example implementations, in accordance with an embodiment, of the UE, base station and host computer discussed in the preceding paragraphs will now be described with reference to FIG. 10. In communication system 1000, host computer 1010 comprises hardware 1015 including communication interface 1016 configured to set up and maintain a wired or wireless connection with an interface of a different communication device of communication system 1000. Host computer 1010 further comprises processing circuitry 1018, which may have storage and/or processing capabilities. In particular, processing circuitry 1018 may comprise one or more programmable processors, application-specific integrated circuits, field programmable gate arrays or combinations of these (not shown) adapted to execute instructions. Host computer 1010 further comprises software 1011, which is stored in or accessible by host computer 1010 and executable by processing circuitry 1018. Software 1011 includes host application 1012. Host application 1012 may be operable to provide a service to a remote user, such as UE 1030 connecting via OTT connection 1050 terminating at UE 1030 and host computer 1010. In providing the service to the remote user, host application 1012 may provide user data which is transmitted using OTT connection 1050.

Communication system 1000 further includes base station 1020 provided in a telecommunication system and comprising hardware 1025 enabling it to communicate with host computer 1010 and with UE 1030. For example, the base station 1020 may be the base station 12 of FIG. 1. The UE 1030 may be the wireless device 16 of FIG. 1. Hardware 1025 may include communication interface 1026 for setting up and maintaining a wired or wireless connection with an interface of a different communication device of communication system 1000, as well as radio interface 1027 for setting up and maintaining at least wireless connection 1070 with UE 1030 located in a coverage area (not shown in FIG. 10) served by base station 1020. Communication interface 1026 may be configured to facilitate connection 1060 to host computer 1010. Connection 1060 may be direct or it may pass through a core network (not shown in FIG. 10) of the telecommunication system and/or through one or more intermediate networks outside the telecommunication system. In the embodiment shown, hardware 1025 of base station 1020 further includes processing circuitry 1028, which may comprise one or more programmable processors, application-specific integrated circuits, field programmable gate arrays or combinations of these (not shown) adapted to execute instructions. Base station 1020 further has software 1021 stored internally or accessible via an external connection.

Communication system 1000 further includes UE 1030 already referred to. Its hardware 1035 may include radio interface 1037 configured to set up and maintain wireless connection 1070 with a base station serving a coverage area in which UE 1030 is currently located. Hardware 1035 of UE 1030 further includes processing circuitry 1038, which may comprise one or more programmable processors, application-specific integrated circuits, field programmable gate arrays or combinations of these (not shown) adapted to execute instructions. UE 1030 further comprises software 1031, which is stored in or accessible by UE 1030 and executable by processing circuitry 1038. Software 1031 includes client application 1032. Client application 1032 may be operable to provide a service to a human or non-human user via UE 1030, with the support of host computer 1010. In host computer 1010, an executing host application 1012 may communicate with the executing client application 1032 via OTT connection 1050 terminating at UE 1030 and host computer 1010. In providing the service to the user, client application 1032 may receive request data from host application 1012 and provide user data in response to the request data. OTT connection 1050 may transfer both the request data and the user data. Client application 1032 may interact with the user to generate the user data that it provides.

It is noted that host computer 1010, base station 1020 and UE 1030 illustrated in FIG. 10 may be similar or identical to host computer 930, one of base stations 12a, 912b, 912c and one of UEs 991, 992 of FIG. 9, respectively. This is to say, the inner workings of these entities may be as shown in FIG. 10 and independently, the surrounding network topology may be that of FIG. 9.

In FIG. 10, OTT connection 1050 has been drawn abstractly to illustrate the communication between host computer 1010 and UE 1030 via base station 1020, without explicit reference to any intermediary devices and the precise routing of messages via these devices. Network infrastructure may determine the routing, which it may be configured to hide from UE 1030 or from the service provider operating host computer 1010, or both. While OTT connection 1050 is active, the network infrastructure may further take decisions by which it dynamically changes the routing (e.g., on the basis of load balancing consideration or reconfiguration of the network).

Wireless connection 1070 between UE 1030 and base station 1020 is in accordance with the teachings of the embodiments described throughout this disclosure. One or more of the various embodiments improve the performance of OTT services provided to UE 1030 using OTT connection 1050, in which wireless connection 1070 forms the last segment. More precisely, the teachings of these embodiments may reduce the memory required in a wireless device to store APN settings, and may improve the speed with which APN settings are found, and thereby provide benefits such as providing a faster connection to the OTT service using APN settings.

A measurement procedure may be provided for the purpose of monitoring data rate, latency and other factors on which the one or more embodiments improve. There may further be an optional network functionality for reconfiguring OTT connection 1050 between host computer 1010 and UE 1030, in response to variations in the measurement results. The measurement procedure and/or the network functionality for reconfiguring OTT connection 1050 may be implemented in software 1011 and hardware 1015 of host computer 1010 or in software 1031 and hardware 1035 of UE 1030, or both. In embodiments, sensors (not shown) may be deployed in or in association with communication devices through which OTT connection 1050 passes; the sensors may participate in the measurement procedure by supplying values of the monitored quantities exemplified above, or supplying values of other physical quantities from which software 1011, 1031 may compute or estimate the monitored quantities. The reconfiguring of OTT connection 1050 may include message format, retransmission settings, preferred routing etc.; the reconfiguring need not affect base station 1020, and it may be unknown or imperceptible to base station 1020. Such procedures and functionalities may be known and practiced in the art. In certain embodiments, measurements may involve proprietary UE signaling facilitating host computer 1010's measurements of throughput, propagation times, latency and the like. The measurements may be implemented in that software 1011 and 1031 causes messages to be transmitted, in particular empty or 'dummy' messages, using OTT connection 1050 while it monitors propagation times, errors etc.

Figure 11:
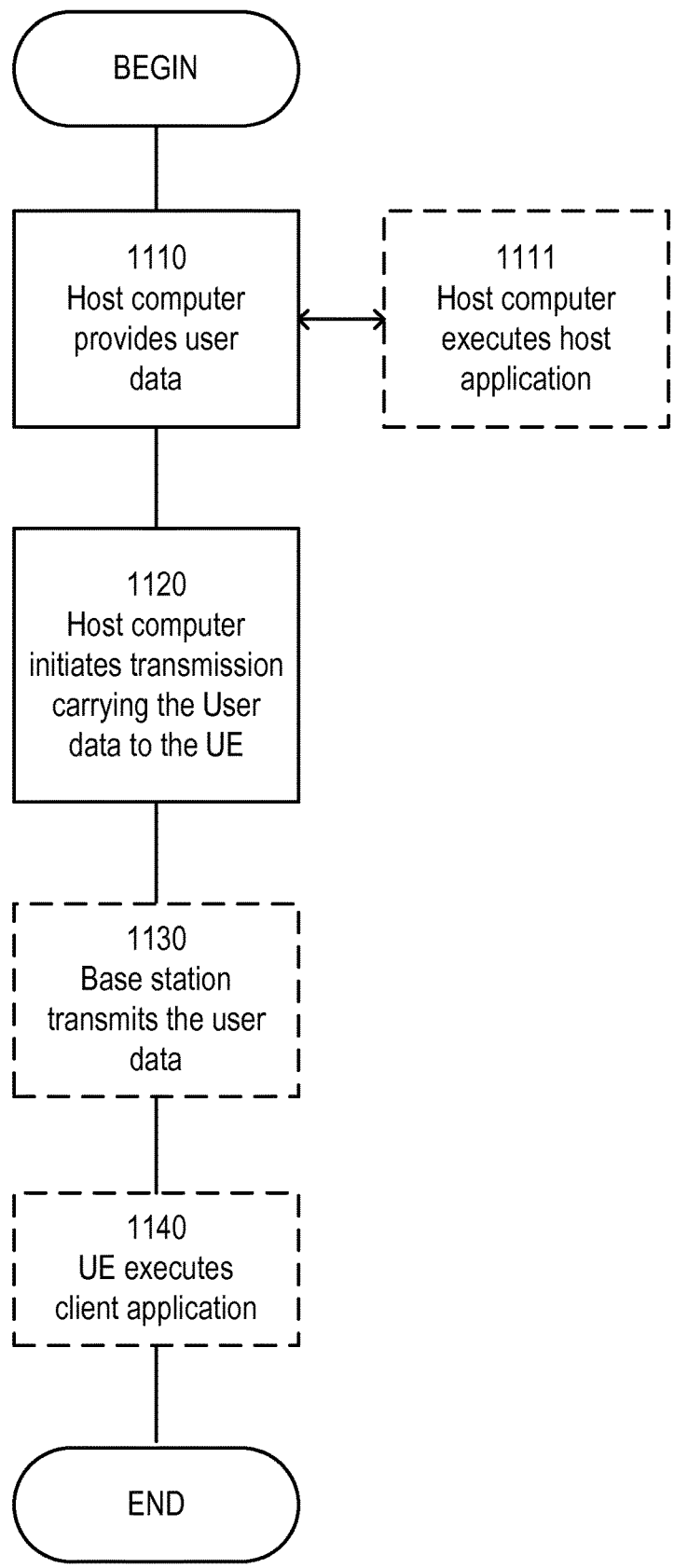
FIG. 11 illustrates methods implemented in a communication system including a host computer, a base station and a user equipment in accordance with some embodiments.

FIG. 11 illustrates methods implemented in a communication system including a host computer, a base station and a user equipment in accordance with some embodiments. FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In step 1110, the host computer provides user data. In substep 1111 (which may be optional) of step 1110, the host computer provides the user data by executing a host application. In step 1120, the host computer initiates a transmission carrying the user data to the UE. In step 1130 (which may be optional), the base station transmits to the UE the user data which was carried in the transmission that the host computer initiated, in accordance with the teachings of the embodiments described throughout this disclosure. In step 1140 (which may also be optional), the UE executes a client application associated with the host application executed by the host computer.

Figure 12:
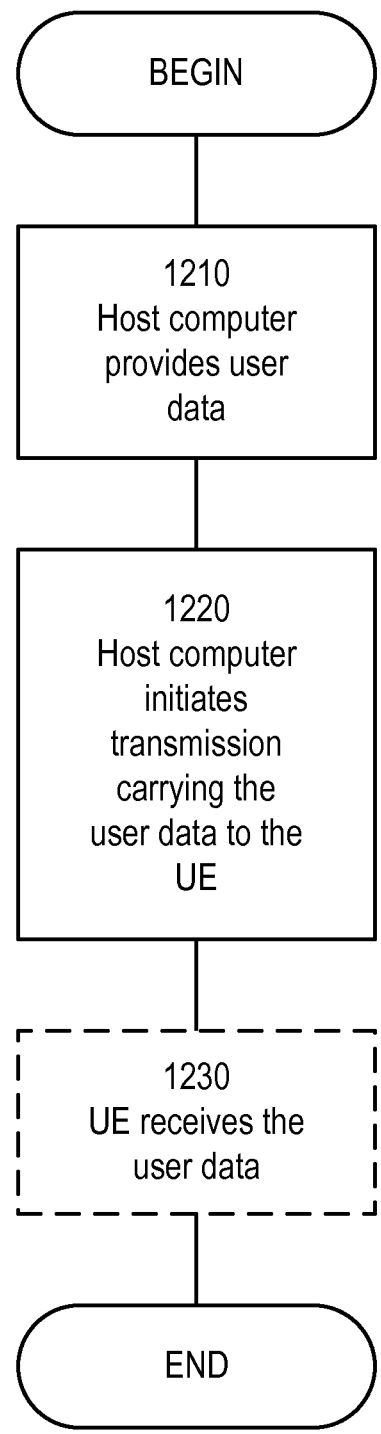
FIG. 12 illustrates methods implemented in a communication system including a host computer, a base station and a user equipment in accordance with some embodiments.

FIG. 12 illustrates methods implemented in a communication system including a host computer, a base station and a user equipment in accordance with some embodiments. FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In step 1210 of the method, the host computer provides user data. In an optional substep (not shown) the host computer provides the user data by executing a host application. In step 1220, the host computer initiates a transmission carrying the user data to the UE. The transmission may pass via the base station, in accordance with the teachings of the embodiments described throughout this disclosure. In step 1230 (which may be optional), the UE receives the user data carried in the transmission.

Figure 13:
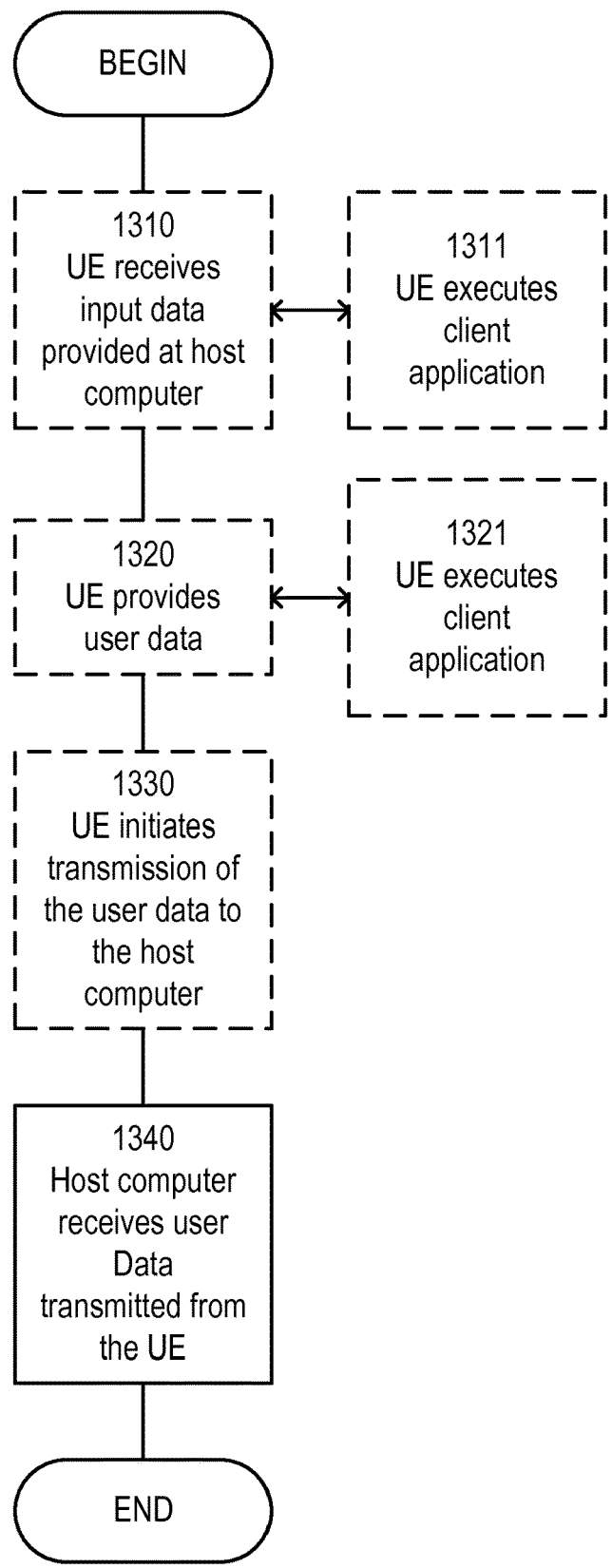
FIG. 13 illustrates methods implemented in a communication system including a host computer, a base station and a user equipment in accordance with some embodiments.

FIG. 13 illustrates methods implemented in a communication system including a host computer, a base station and a user equipment in accordance with some embodiments. FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In step 1310 (which may be optional), the UE receives input data provided by the host computer. Additionally or alternatively, in step 1320, the UE provides user data. In substep 1321 (which may be optional) of step 1320, the UE provides the user data by executing a client application. In substep 1311 (which may be optional) of step 1310, the UE executes a client application which provides the user data in reaction to the received input data provided by the host computer. In providing the user data, the executed client application may further consider user input received from the user. Regardless of the specific manner in which the user data was provided, the UE initiates, in substep 1330 (which may be optional), transmission of the user data to the host computer. In step 1340 of the method, the host computer receives the user data transmitted from the UE, in accordance with the teachings of the embodiments described throughout this disclosure.

Figure 14:
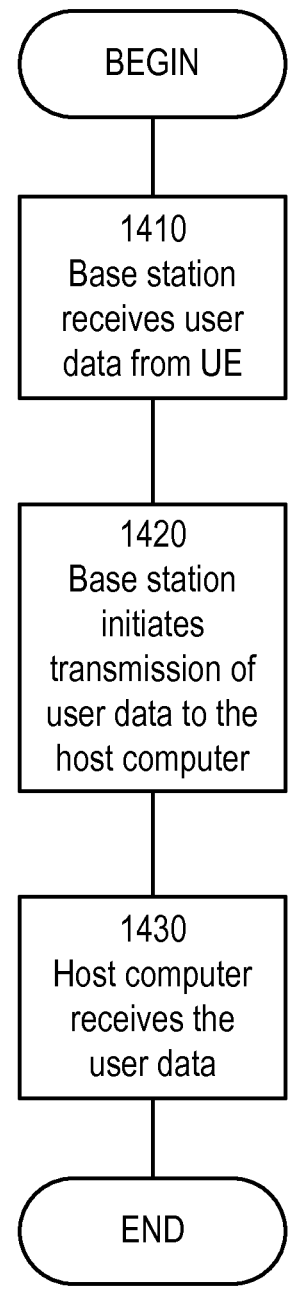
FIG. 14 illustrates methods implemented in a communication system including a host computer, a base station and a user equipment in accordance with some embodiments.

FIG. 14 illustrates methods implemented in a communication system including a host computer, a base station and a user equipment in accordance with some embodiments. FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In step 1410 (which may be optional), in accordance with the teachings of the embodiments described throughout this disclosure, the base station receives user data from the UE. In step 1420 (which may be optional), the base station initiates transmission of the received user data to the host computer. In step 1430 (which may be optional), the host computer receives the user data carried in the transmission initiated by the base station.

The embodiments described herein therefore disclose using Bloom filters to store information relating to Operator IDs which are configured for use with a particular connection setting. Using Bloom filters to store this information may lead to significant reduction in memory usage in storing the database on the wireless device. In addition, Bloom filters allow a fast and energy efficient search of the connections settings compared to implementations which use a plain text search. The database size when using Bloom filters for storing Operator IDs and connection settings may be reduced to under 10% of the original size and search operations may require under 3% of average computational resources needed for a plain text search.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method in a wireless device for connecting to a communications network using one of a plurality of connection settings, the method comprising:
   obtaining an operator identification;
   applying one or more first hash functions, associated with a first Bloom filter, to the operator identification to provide one or more first hash values respectively;
   comparing the one or more first hash values to the first Bloom filter; and
   responsive to the one or more first hash values matching the first Bloom filter, attempting a connection with the communications network using a first one of the plurality of connection settings which is associated with the first Bloom filter.

2. The method as claimed in claim 1, further comprising determining whether the one or more first hash values match the first Bloom filter.

3. The method as claimed in claim 1, further comprising, responsive to the step of attempting a connection with the communications network using the first connection setting being unsuccessful, applying one or more second hash functions, associated with a second Bloom filter, to the operator identification to provide one or more second hash values respectively; and
   responsive to the one or more second hash values matching the second Bloom filter, attempting a connection with the communications network using a second one of the plurality of connection settings which is associated with the second Bloom filter.

4. The method as claimed in claim 3, wherein the second hash functions are the same as the first hash functions.

5. The method as claimed in claim 1, wherein the method further comprises:
   responsive to one of the one or more first hash values not matching the first Bloom filter, applying one or more third hash functions, associated with a third Bloom filter, to the operator identification to provide one or more third hash values respectively; and
   responsive to the one or more third hash values matching the third Bloom filter, attempting a connection with the communications network using a third one of the plurality of connection settings which is associated with the third Bloom filter.

6. The method as claimed in claim 5, wherein the third hash functions are the same as the first hash functions.

7. The method as claimed in claim 1, further comprising:
   storing in a database a plurality of Bloom filters, each generated from at least one operator identification, wherein each Bloom filter is associated with one of the plurality of connection settings.

8. The method as claimed in claim 1, wherein each of the plurality of connection settings comprises an Access Point Name, APN, connection setting.

9. The method as claimed in claim 1, wherein each of the plurality of connections settings comprises one or more of: an Access Point Name, APN, a username and a password.

10. The method as claimed in claim 1, wherein the each of the plurality of connection settings comprises a Multimedia Messaging Service, MMS, connection setting.

11. The method as claimed in claim 1, wherein the step of obtaining the operator identification occurs in response to the wireless device requesting information associated with a subscriber identity module, SIM.

12. The method as claimed in claim 11, wherein the step of obtaining the operator identification occurs in response to the wireless device booting up.

13. The method as claimed in claim 11, wherein the step of obtaining the operator identification occurs in response to a connection between the wireless device and the communications network being lost.

14. The method as claimed in claim 11, wherein the step of obtaining the operator identification comprises:
   retrieving an International Mobile Subscriber Identity, IMSI, from the SIM; and
   deriving the operator identification from the IMSI.

15. The method as claimed in claim 1, wherein the communications network is a Packet Data Network, PDN.

16. A computer program product comprising a non-transitory computer readable medium storing a computer program comprising instructions which, when executed on at least one processor, cause the at least one processor to carry out the method according to claim 1.

17. A wireless device for connecting to a communications network using one of a plurality of connection settings, the wireless device comprising:
   an interface; and
   a processor, wherein the processor is operable to:
   obtain an operator identification;
   apply one or more first hash functions, associated with a first Bloom filter, to the operator identification to provide one or more first hash values respectively;
   compare the one or more first hash values to the first Bloom filter; and
   responsive to the one or more first hash values matching the first Bloom filter, attempt a connection with the communications network using a first one of the plurality of connection settings which is associated with the first Bloom filter.

18. The wireless device as claimed in claim 17, wherein the processor is further configured to, responsive to an attempted connection with the communications network using the first connection setting being unsuccessful, apply one or more second hash functions, associated with a second Bloom filter, to the operator identification to provide one or more second hash values respectively; and
   responsive to the one or more second hash values matching the second Bloom filter, attempt a connection with the communications network using a second one of the plurality of connection settings which is associated with the second Bloom filter.

19. The wireless device as claimed in claim 18, wherein the second hash functions are the same as the first hash functions.

20. The wireless device as claimed in claim 17, wherein the processor is further configured to, responsive to one of the one or more first hash values not matching the first Bloom filter, apply one or more third hash functions, associated with a third Bloom filter, to the operator identification to provide one or more third hash values respectively; and
   responsive to the one or more third hash values matching the third Bloom filter, attempt a connection with the communications network using a third one of the plurality of connection settings which is associated with the third Bloom filter.

21. The wireless device as claimed in claim 20, wherein the third hash functions are the same as the first hash functions.

22. The wireless device as claimed in claim 17, further comprising;
   a database comprising information relating to a plurality of Bloom filters, each generated from at least one operator identification, wherein each Bloom filter is associated with one of the plurality of connection settings.

23. The wireless device as claimed in claim 17, wherein each of the plurality of connection settings comprises an Access Point Name, APN, connection setting.

24. The wireless device as claimed in claim 17, wherein each of the plurality of connection settings comprises one or more of: an Access Point Name, APN, a username and a password.

25. The wireless device as claimed in claim 17, wherein each of the plurality of connection settings comprises a Multimedia Messaging Service, MMS, connection setting.

26. The wireless device as claimed in claim 17, wherein the processor is configured to obtain the operator identification in response to the wireless device requesting information associated with a subscriber identity module, SIM.

27. The wireless device as claimed in claim 26, wherein the processor is configured to obtain the operator identification in response to the wireless device booting up.

28. The wireless device as claimed in claim 26, wherein the processor is configured to obtain the operator identification in response to a connection between the wireless device and the communications network being lost.

29. The wireless device as claimed in claim 26, wherein the processor is configured to obtain the operator identification by:

retrieving an International Mobile Subscriber Identity, IMSI, from the SIM; and deriving the operator identification from the IMSI.

30. The wireless device as claimed in claim 17, wherein the communications network is a Packet Data Network, PDN.

31. The wireless device as claimed in claim 17, wherein the processor is further configured to determine whether the one or more first hash values match the first Bloom filter.

* * * * *